US010103595B2

(12) United States Patent
Shirasaka (10) Patent No.: US 10,103,595 B2
(45) Date of Patent: Oct. 16, 2018

(54) STATOR HAVING INSULATOR WITH YARN PASSAGE PORTION, MOTOR HAVING THE STATOR, AND COMPRESSOR

(71) Applicant: DAIKIN INDUSTRIES, LTD., Osaka-shi, Osaka (JP)

(72) Inventor: Hiroki Shirasaka, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/566,132

(22) PCT Filed: Apr. 15, 2016

(86) PCT No.: PCT/JP2016/062104
§ 371 (c)(1),
(2) Date: Oct. 12, 2017

(87) PCT Pub. No.: WO2016/167344
PCT Pub. Date: Oct. 20, 2016

(65) Prior Publication Data
US 2018/0091014 A1   Mar. 29, 2018

(30) Foreign Application Priority Data
Apr. 16, 2015  (JP) .................................. 2015-084405

(51) Int. Cl.
| H02K 3/38 | (2006.01) |
| H02K 3/18 | (2006.01) |
| H02K 3/52 | (2006.01) |
| H02K 1/14 | (2006.01) |
| F04C 29/00 | (2006.01) |

(Continued)

(52) U.S. Cl.
CPC ............ *H02K 3/38* (2013.01); *F04C 29/0085* (2013.01); *H02K 1/146* (2013.01); *H02K 3/18* (2013.01);

(Continued)

(58) Field of Classification Search
CPC .. H02K 3/38; H02K 3/18; H02K 3/28; H02K 3/522; H02K 3/32; H02K 3/50; H02K 3/52; H02K 1/146; H02K 1/18; H02K 1/185

(Continued)

(56) References Cited

U.S. PATENT DOCUMENTS

2009/0102307 A1   4/2009  Amano

FOREIGN PATENT DOCUMENTS

| JP | 3-30759 U | 3/1991 |
| JP | 03030759 U * | 3/1991 |

(Continued)

OTHER PUBLICATIONS

Machine translation of JP 2003097439 A (Apr. 2003).*

(Continued)

*Primary Examiner* — Michael Andrews
(74) *Attorney, Agent, or Firm* — Global IP Counselors, LLP (57) ABSTRACT

A stator includes a core having inwardly extending teeth, an insulator placed on an end surface of the core, coil windings wound the teeth, outgoing lines extending from both ends of the coil windings, and a yarn securing the outgoing lines to the insulator. The insulator has an outer wall surrounding a central axis and erected to upwardly extend from the end surface, a plurality of teeth cover portions radially inwardly extending from the outer wall, and a plurality of inner walls erected at an end portions of the teeth cover portions. The coil windings are placed between the outer wall and corresponding inner walls. A passage portion radially extends and is formed in at least one of the teeth cover portions to pass the yarn, and the passage portion is spaced from the coil windings.

18 Claims, 10 Drawing Sheets

(51) Int. Cl.
*H02K 3/28* (2006.01)
*F04C 29/02* (2006.01)

(52) U.S. Cl.
CPC .............. *H02K 3/28* (2013.01); *H02K 3/522* (2013.01); *F04C 29/02* (2013.01); *F04C 2210/26* (2013.01); *F04C 2240/30* (2013.01); *F04C 2240/40* (2013.01)

(58) Field of Classification Search
USPC ................................................... 310/71, 260
See application file for complete search history.

(56) References Cited

FOREIGN PATENT DOCUMENTS

| JP | 10-174337 | A |   | 6/1998 |           |
|----|-----------|---|---|--------|-----------|
| JP | 10174337  | A | * | 6/1998 | H02K 3/34 |
| JP | 2003-97439 | A |   | 4/2003 |           |
| JP | 2003097439 | A | * | 4/2003 | H02K 3/38 |
| JP | 3824001   | B2 |  | 7/2006 |           |

OTHER PUBLICATIONS

Machine translation of JP 10174337 A (Jun. 1998).*
Machine translation of JP 03030759 U (Mar. 1991).*
International Preliminary Report of corresponding PCT Application No. PCT/JP2016/062104 dated Oct. 26, 2017.
Notification of Reasons for Refusal of corresponding JP Application No. 2016-079943 dated Jul. 19, 2016.
International Search Report of corresponding PCT Application No. PCT/JP2016/062104 dated Jul. 19, 2016.
European Search Report of corresponding EP Application No. 16 78 0135.6 dated May 18, 2018.

* cited by examiner

STATOR HAVING INSULATOR WITH YARN PASSAGE PORTION, MOTOR HAVING THE STATOR, AND COMPRESSOR

CROSS-REFERENCE TO RELATED APPLICATIONS

This U.S. National stage application claims priority under 35 U.S.C. § 119(a) to Japanese Patent Application No. 2015-084405, filed in Japan on Apr. 16, 2015, the entire contents of which are hereby incorporated herein by reference.

TECHNICAL FIELD

The present invention relates to a stator as well as a motor and a compressor having the stator.

BACKGROUND ART

A motor has a stator and a rotor arranged in an inner cavity of this stator. The stator includes a stator core and an insulator placed on an end surface thereof. A plurality of teeth for winding coil windings is formed in the stator core. Outgoing lines extending from both ends of each of the coil windings extend for a long distance, and finally reach mutual connection points or power terminals. These long outgoing lines extend around and in the vicinity of a plurality of coils as disclosed in JP-B-3824001, for example.

SUMMARY

Technical Problem

In order to prevent the motor from being affected by vibration and the like, the extending outgoing lines are tied and secured relative to the insulator with a yarn. Since this tying operation is a complicated process, it may be manually performed. One example of a specific sequence of the tying operation is performed as described below. Initially, an operator leads the yarn using a dedicated needle so that the yarn will pass between the outgoing lines and the coil windings. Next, the operator uses the needle to pass the yarn through a hole disposed in the insulator or engages the yarn in a hook-shaped portion disposed in the insulator. Lastly, the operator ties the yarn. During this operation, the operator may accidentally puncture the outgoing lines or the coil windings with the needle, thereby causing a fracture of an insulation covering or an insulation coating disposed thereon. Therefore, the tying operation of outgoing lines needs effort, time, and attention.

An object of the present invention is to facilitate a tying operation of outgoing lines in order to reduce the occurrence of a defective product during the manufacture of a motor to enhance a production efficiency.

Solution to Problem

A stator according to a first aspect of the present invention has a central axis. The stator comprises a core, an insulator, a plurality of coil windings, outgoing, lines, and a yarn. The core has a plurality of teeth radially inwardly extending toward the central axis. The insulator is placed on an end surface of the core. The coil windings are each wound around one of the teeth. The outgoing lines extend from both ends of each of the coil windings. The yarn secures the outgoing lines to the insulator. The insulator has an outer wall, a plurality of teeth cover portions, and a plurality of inner walls. The outer wall surrounds the central axis and is erected in such a way as to upwardly extend from the end surface. The teeth cover portions radially inwardly extend from the outer wall toward the central axis. The inner walls are each erected at an end portion of each of the teeth cover portions. The coil windings are placed between the outer wall and the corresponding inner walls. A passage portion radially extending is formed in at least one of the teeth cover portions. The passage portion passes the yarn.

With this configuration, the passage portion is formed in at least one of the teeth cover portions. The yarn for securing the outgoing lines is passed through this passage portion by a dedicated needle. During this operation, the contact between the needle and the coil windings or the outgoing lines is reduced. Therefore, insulation failure due to damage to the outgoing lines and/or the coil windings is able to be reduced, which is able to facilitate a tying operation of the outgoing lines.

A stator according to a second aspect of the present invention is the stator according to the first aspect, in which at least one of the inner walls has yarn constraint means for constraining the yarn.

With this configuration, the yarn constraint means disposed in at least one of the inner walls reduces the contact between the yarn and a rotor. Therefore, the hindrance to the rotation of the rotor by the yarn is able to be reduced.

A stator according to a third aspect of the present invention is the stator according to the second aspect, in which the passage portion is formed in each of two or more of the teeth cover portions. Two or more of the inner walls each have the yarn constraint means.

With this configuration, the outgoing lines are tied at two or more locations. Therefore, the outgoing lines are further secured.

A stator according to a fourth aspect of the present invention is the stator according to the second or third aspect, in which the yarn constraint means includes a groove for housing the yarn.

With this configuration, the yarn constraint means disposed in the corresponding inner wall includes the groove for housing the yarn. Therefore, the yarn is housed in the groove and thus is not exposed at a surface of the inner wall, which is able to further reduce the hindrance to the rotation of the rotor by the yarn.

A stator according to a fifth aspect of the present invention is the stator according to any one of the second to fourth aspects, in which the yarn constraint means includes a notch for engaging with the yarn.

With this configuration, the yarn constraint means disposed in the corresponding inner wall includes the notch for engaging with the yarn. Therefore, the movement of the yarn in the inner wall is further reduced.

A stator according to a sixth aspect of the present invention is the stator according to any one of the first to fifth aspects, in which a notch for engaging with the yarn is disposed at a location above the passage portion in the outer wall.

With this configuration, the notch accepting the yarn is formed in the outer wall. Therefore, the misalignment of the yarn is able to be reduced.

A stator according to a seventh aspect of the present invention is the stator according to any one of the first to sixth aspects, in which the passage portion has a circular, an elliptical, or a triangular sectional shape.

With this configuration, specific shapes of the passage portion are determined.

A motor according to an eighth aspect of the present invention comprises the stator and a rotor. The stator is the stator according to any one of the first to seventh aspects. The rotor magnetically interacts with the stator.

With this configuration, the motor has the stator according to the present invention. Therefore, the assembly of the motor is facilitated, which prevents fractures of parts during manufacture.

A compressor according to a ninth aspect of the present invention comprises the motor, a shaft, a fluid compression mechanism, and a pressure vessel. The motor is the motor according to the eighth aspect. The shaft is allowed to rotate by the motor. The fluid compression mechanism compresses fluid with the rotation of the shaft. The pressure vessel houses the motor, the shaft, and the fluid compression mechanism.

With this configuration, the compressor has the motor according to the present invention. Therefore, the assembly of the compressor is facilitated, which is able to reduce fractures of parts.

Advantageous Effects of Invention

The stator according to the first aspect of the present invention is able to reduce the insulation failure due to damage to the outgoing lines and/or the coil windings.

The stator according to the second or fourth aspect of the present invention is able to reduce the hindrance to the rotation of the rotor by the yarn.

The stator according to the third aspect of the present invention allows the outgoing lines to be further secured.

The stator according to the fifth or sixth aspect of the present invention is able to reduce the movement of the yarn.

The stator according to the seventh aspect of the present invention is provided with the insulator of which specific designs are presented.

The motor according to the eighth aspect of the present invention is readily assembled.

The compressor according to the ninth aspect of the present invention is readily assembled.

DESCRIPTION OF EMBODIMENTS

First Embodiment (1) Overall Configuration

Figure 1:
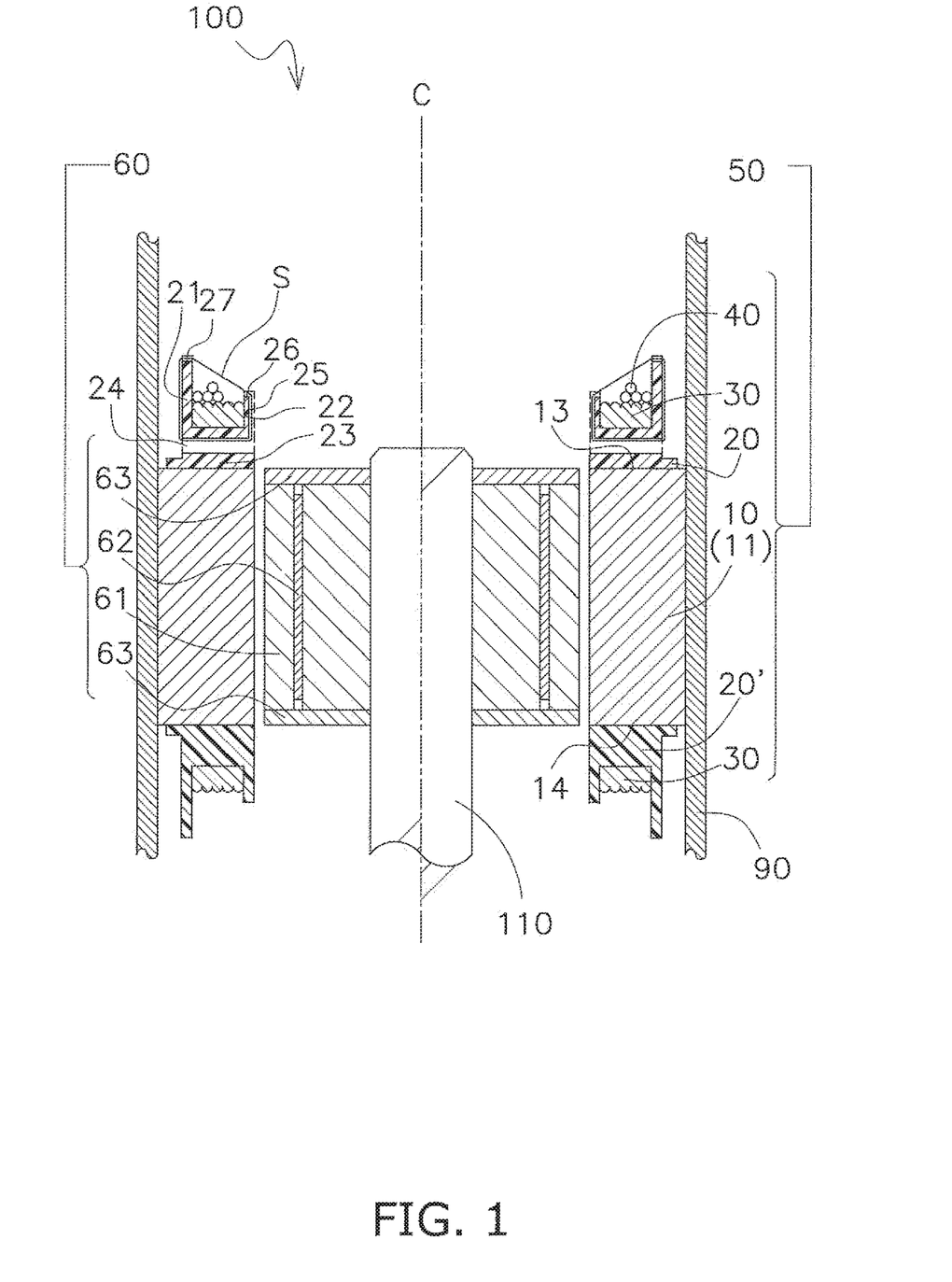
FIG. 1 is a sectional view of a motor 100 according to a first embodiment of the present invention.

FIG. 1 is a sectional view of a motor 100 according to a first embodiment of the present invention. The motor 100 is provided with a stator 50 attached to a casing 90 and a rotor 60 attached to a shaft 110. The stator 50A is cylindrically shaped and disposed around the periphery of the rotor 60. The stator 50 and the rotor 60 magnetically interact with each other to allow the rotor 60 and the shaft 110 to rotate about a central axis C.

(2) Detailed Configuration (2-1) Stator 50

As shown in FIG. 1, the stator 50 is provided with a stator core 10, an upper insulator 20, a lower insulator 20', coil windings 30, outgoing lines 40, and a yarn S.

Figure 2:
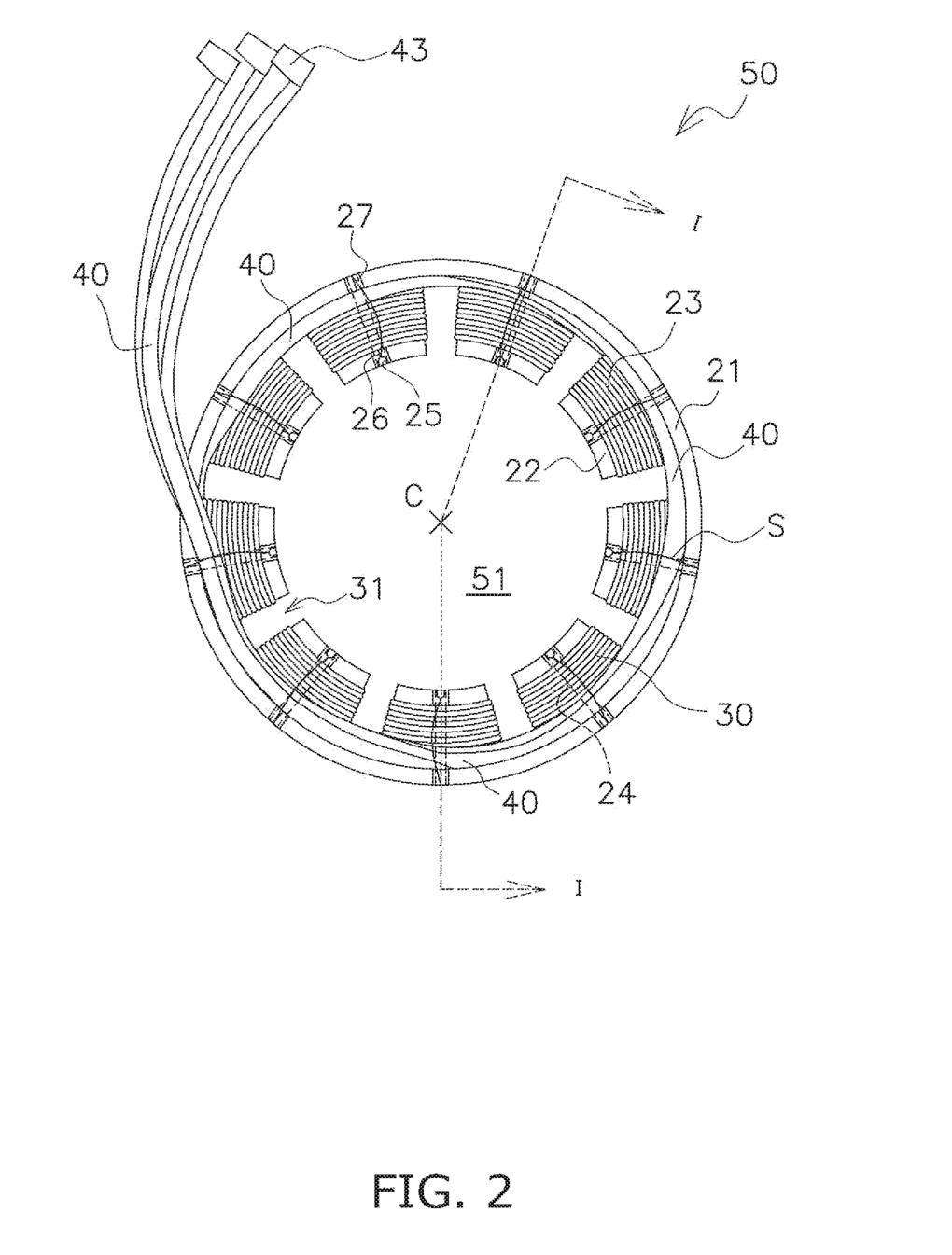
FIG. 2 is a plan view of a stator 50 of the motor according to the first embodiment of the present invention.

FIG. 2 is a plan view of the stator 50. A cavity 51 for housing the rotor 60 is formed in the stator 50. The cavity 51 includes the central axis C of the stator 50A. The plane along the line I-I this figure corresponds to the portion of the stator 50 in the sectional view of FIG. 1.

(2-1-1) Stator Core 10

Figure 3:
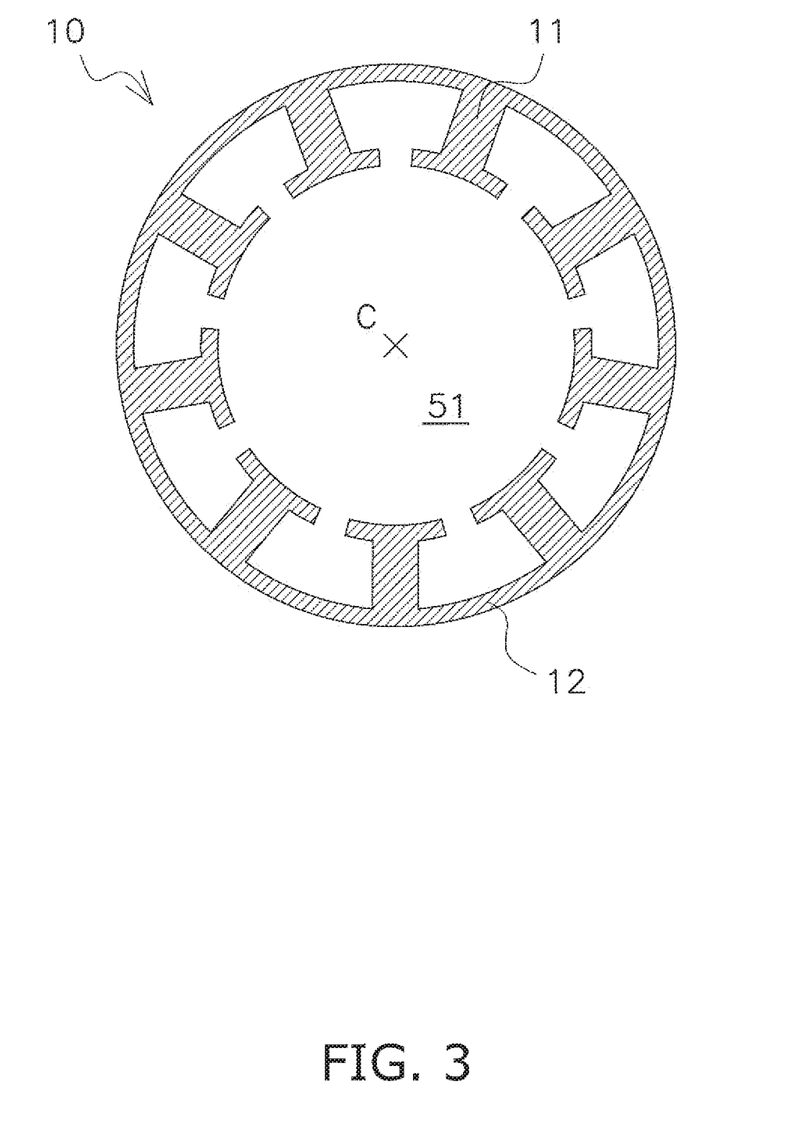
FIG. 3 is a plan view of a stator core 10 of the motor according to the first embodiment of the present invention.

FIG. 3 is a plan view of the stator core 10. The stator core 10 is composed of a laminated steel sheet, for example, and has a cylindrical portion 12 and the nine teeth 11 extending from the cylindrical portion 12 toward the central axis C.

(2-1-2) Upper Insulator 20

The upper insulator 20 as shown in FIG. 1 is disposed on an upper end surface 13 of the stator core 10, and is made of a resin, for example.

Figure 4:
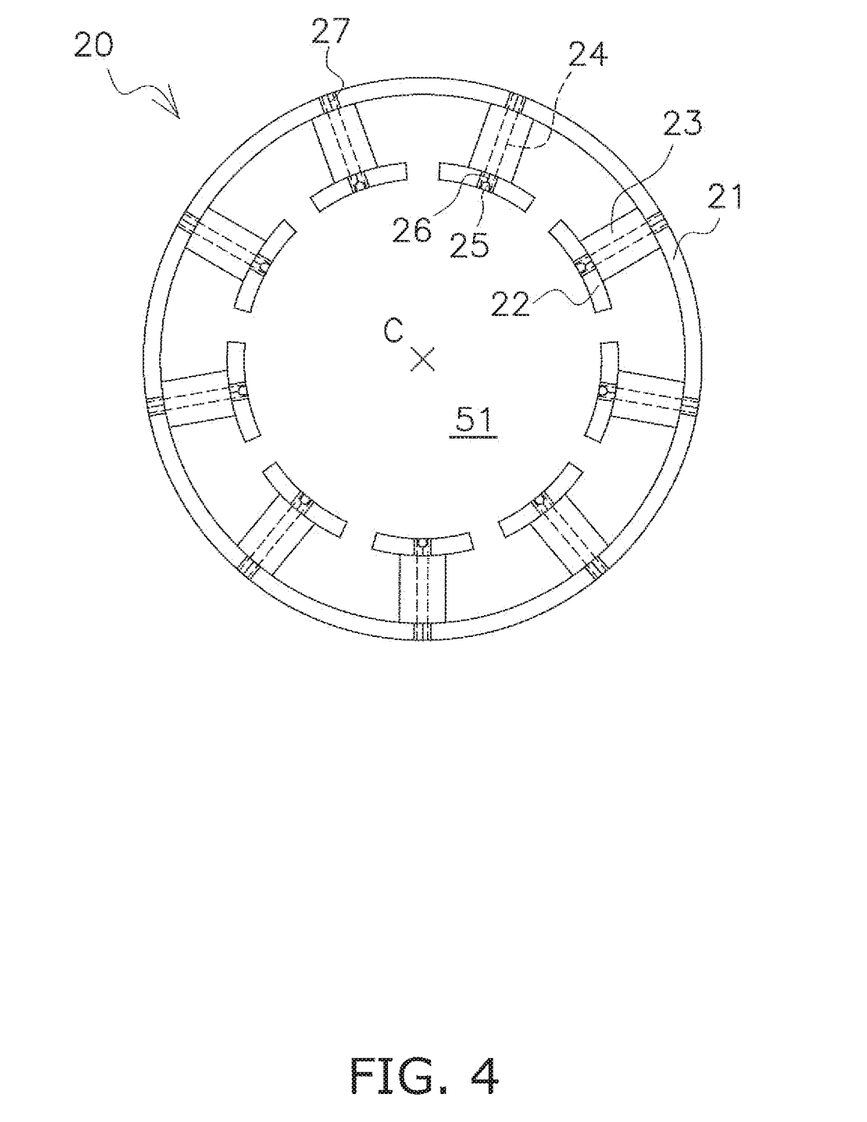
FIG. 4 is a plan view of an insulator 20 of the motor according to the first embodiment of the present invention.

FIG. 4 is a plan view of the insulator 20. The insulator 20 has a cylindrical outer wall 21, a plurality of teeth cover portions 23 extending from the outer wall 21 toward the central axis C, and inner walls 22 which are each disposed at a distal end of each of the teeth cover portions.

Furthermore, the insulator 20 has a plurality of passage portions 24 which extend through the outer wall 21, the corresponding teeth cover portions 23, and the corresponding inner walls 22. The passage portions 24 pass the later-described yarn S. In the present embodiment, the passage portions 24 are formed as holes.

Figure 5:
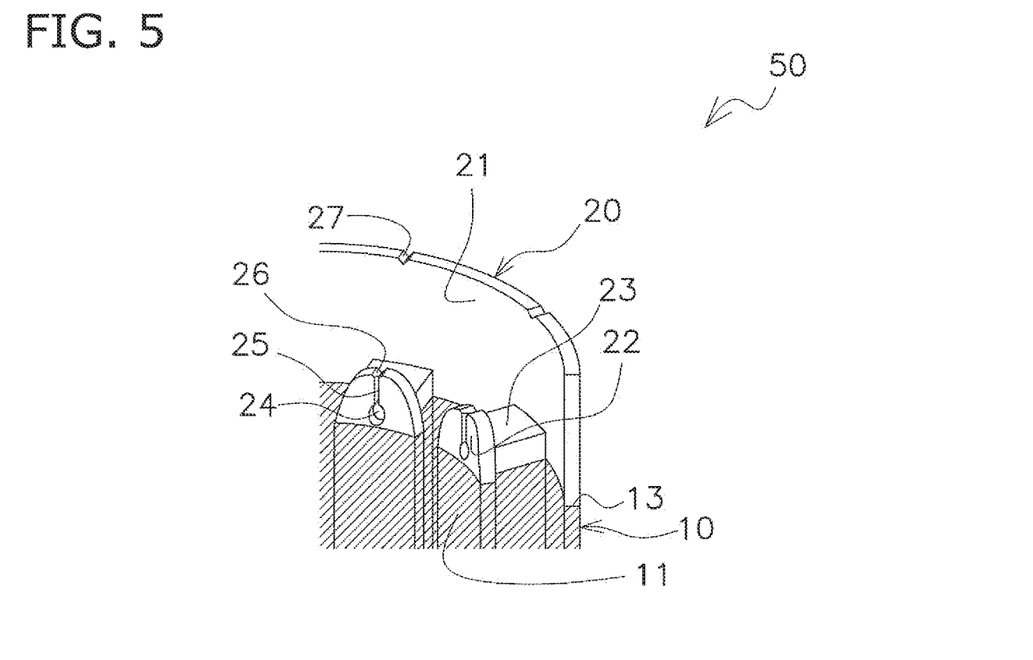
FIG. 5 is a perspective view of the insulator 20 placed on the stator core 10.

FIG. 5 shows the insulator 20 placed on the stator core 10. A portion of each of the teeth 11 on the upper end surface 13 of the stator core 10 is covered with an associated inner wall 22 and teeth cover portion 23.

Each of the passage portions 24 is disposed at the center of the corresponding inner wall 22. A groove 25 is disposed from the center to the upper end of each of the inner walls 22. A notch 26 is disposed at the upper end of each inner wall 22.

Furthermore, a notch 27 is disposed at a location at the upper end of the outer wall 21 corresponding to a base of each teeth cover portion 23.

(2-1-3) Lower Insulator 20'

The lower insulator 20' as shown in FIG. 1 is disposed on a lower end surface 14 of the stator core 10, and is made of a resin, for example. The lower insulator 20' does not especially have a function of restraining the outgoing lines 40.

(2-1-4) Coil Winding 30

As shown in FIG. 2, the stator 50 has the nine coil windings 30, the number of which is the same as that of the teeth 11.

As shown in FIG. 1, each of the coil windings 30 is wound around one of the teeth cover portions 23 of the upper insulator 20, one of the teeth 11 of the stator core 10, and one of teeth cover portions of the lower insulator 20.

Figure 6:
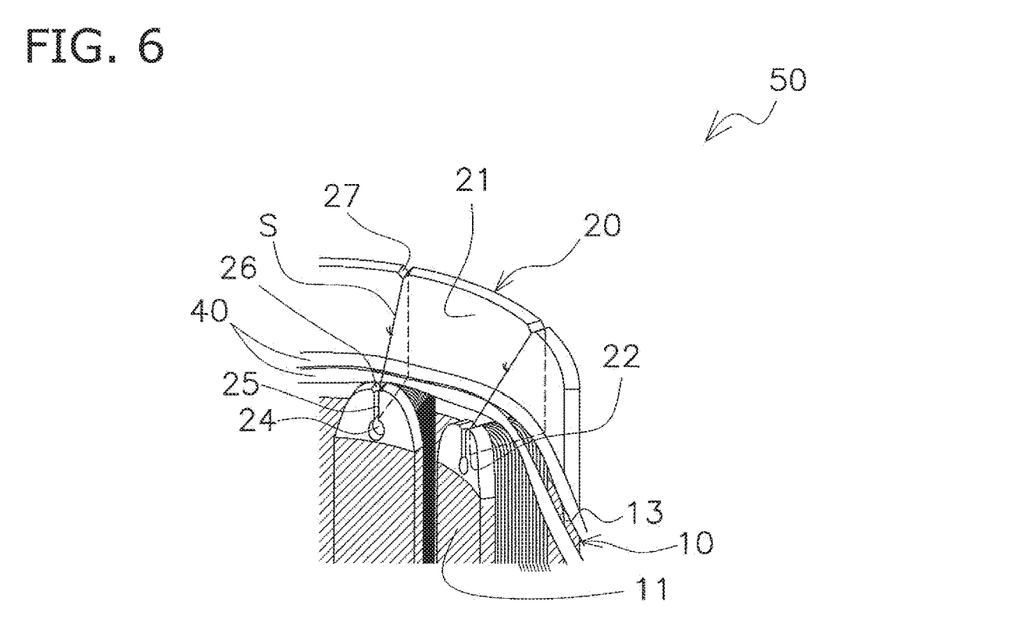
FIG. 6 is a perspective view of the stator 50 of the motor according to the first embodiment of the present invention.

FIG. 6 shows the stator 50 to which the coil windings 30 are attached. The coil windings 30 pass on the corresponding teeth cover portions 23 (FIG. 5) and between the outer wall 21 and the corresponding inner walls 22.

The coil windings 30 may have a portion covered with an insulation covering or a portion on which an insulation coating is applied.

Figure 7:
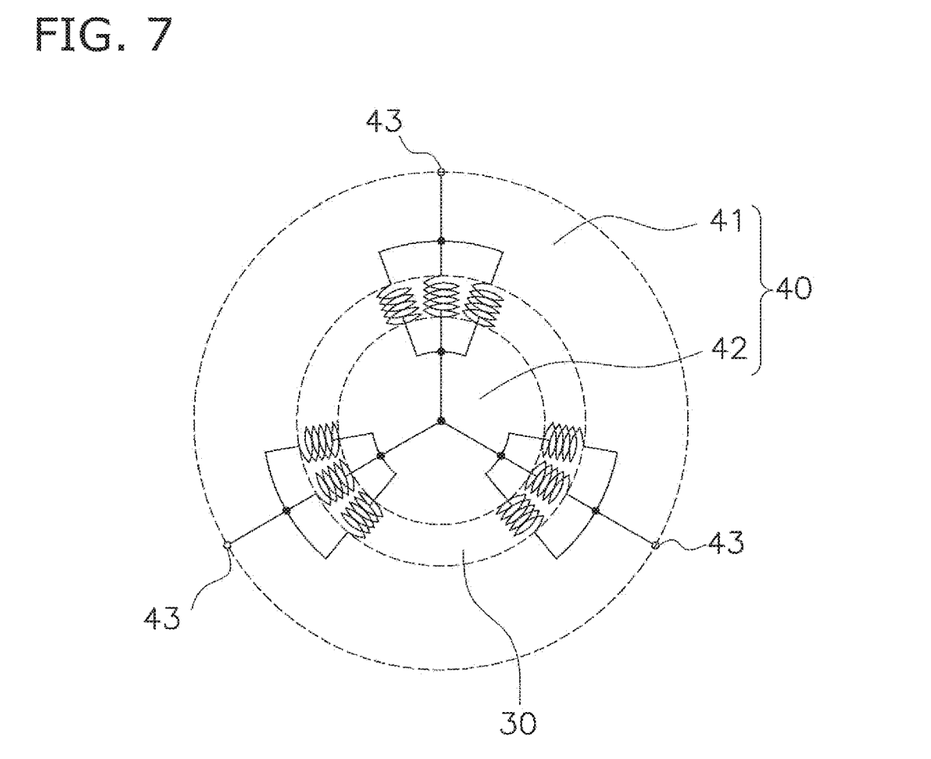
FIG. 7 is a diagram of an electrical circuit of the stator 50 of the motor according to the first embodiment of the present invention.

FIG. 7 shows an electrical circuit of the stator 50. The nine coil windings 30 constitute three phases. Each of the phases is made of three coil windings 30 connected in parallel.

(2-1-5) Outgoing Line 40

As shown in FIG. 7, the outgoing lines 40 extend from both ends of all of the coil windings 30. One outgoing line 40 is connected to any one of the other outgoing lines 40. Among these outgoing lines 40, a location connected to a terminal 43 for applying an exciting current is referred to as a power line 41, and a location connected to all of the coil windings 30 at one end is referred to as a neutral line 42. The outgoing lines 40 may have a portion covered with an insulation covering or a portion on which an insulation coating is applied.

(2-1-6) Yarn S

As shown in FIG. 6, the outgoing lines 40 rest on the coil windings 30, and are tied with the yarn S passing through the passage portion 24 to be restrained. The yarn S passes through the corresponding groove 25 and notch 26 disposed in the corresponding inner wall 22, and engages with the corresponding notch 27 at the upper end of the outer wall 21. Thus, the yarn S is constrained.

(2-2) Rotor 60

As shown in FIG. 1, the rotor 60 is provided with a rotor core 61, permanent magnets 62, and upper and lower end plates 63 two in total.

The rotor core 61 is composed of a laminated steel sheet, for example.

The permanent magnets 62 form poles and are housed in through holes disposed in the rotor core 61.

The two end plates 63 cover the upper surface and the lower surface of the rotor core 61 to prevent the permanent magnets 62 from being detached from the through holes of the rotor core 61.

(3) Assembly of the Stator 50

The stator 50 is assembled in the sequence as described below.

Initially, the upper insulator 20 and the lower insulator 20' are, respectively, placed on the upper end surface 13 and the lower end surface 14 of the stator core 10.

Next, a conductor wire is wound around each of the teeth 11 and its associated teeth cover portion 23 so that the coil windings 30 will be made.

Next, the outgoing lines 40 extending from both ends of each of the coil windings 30 are led by an operator and rested on the coil windings 30.

Figure 8A:
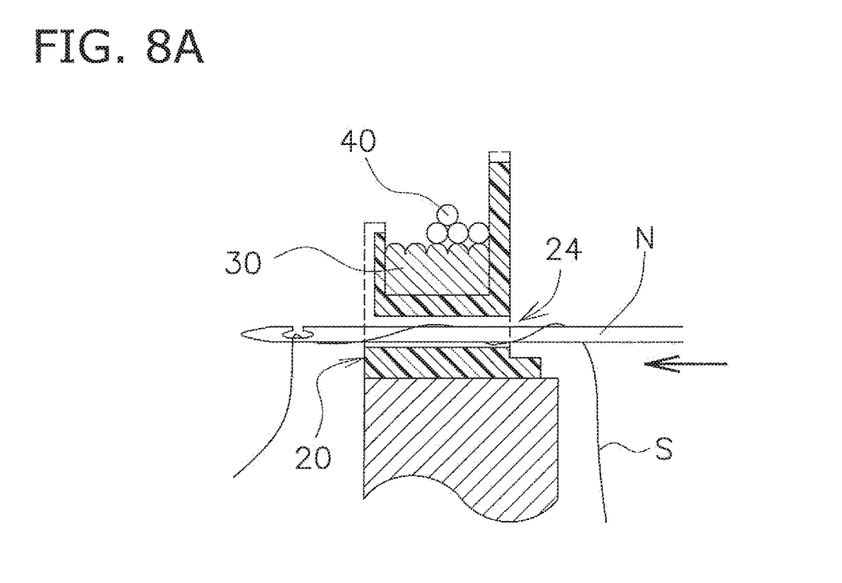
FIG. 8A shows a process for tying outgoing lines 40 with a yarn S.

Next, as shown in FIG. 8A, the yarn S is passed through the passage portion 24 with a needle N by the operator.

Figure 8B:
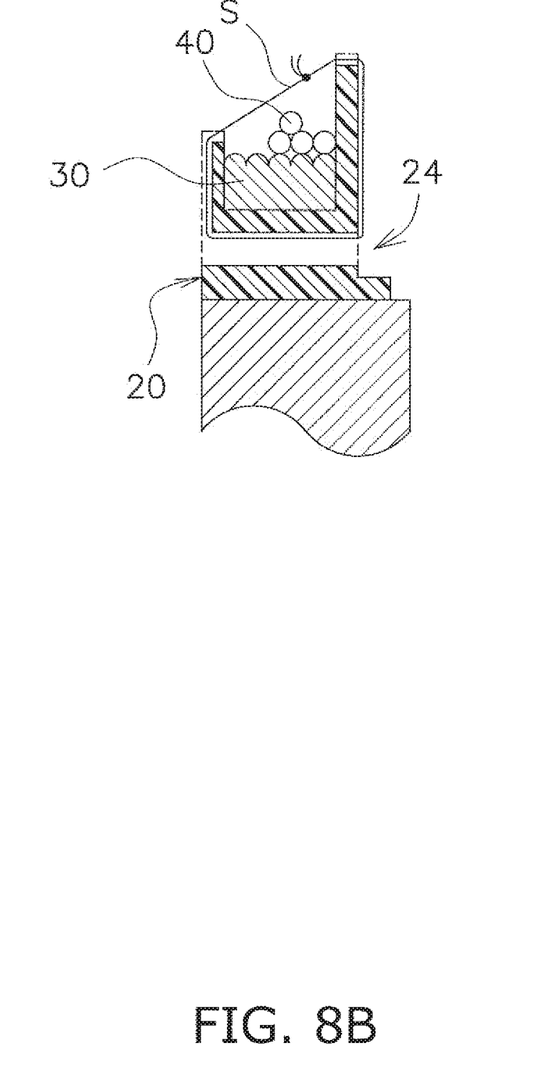
FIG. 8B shows the process for tying the outgoing lines 40 with the yarn S.

Lastly, as shown in FIG. 8B, the yarn S is tied so that the outgoing lines 40 will be restrained relative to the insulator 20.

(4) Characteristics (4-1)

Each passage portion 24 is formed in the corresponding teeth cover portion 23. The yarn S for securing the outgoing lines 40 is passed through the passage portion 24 by the needle N. During this operation, the needle N does not come into contact with the coil windings 30 or the outgoing lines 40. Therefore, insulation failure due to damage to the outgoing lines 40 and/or the coil windings 30 is able to be reduced, which is able to facilitate a tying operation of the outgoing lines 40.

(4-2)

The groove 25 and the notch 26 disposed in each inner wall 22 constrain the yarn S to reduce the contact between the yarn S and the rotor 60. Therefore, the hindrance to the rotation of the rotor 60 by the yarn S is able to be reduced.

(4-3)

Two or more passage portions 24, two or more grooves 25, and two or more notches 26, and two or more notches 27 are present. Therefore, the outgoing lines 40 are tied at two or more locations, and the outgoing lines 40 are thus further secured.

(4-4)

The yarn S is housed in the groove 25 disposed on the corresponding inner wall 22. Therefore, the yarn S is not exposed at a surface of the inner wall 22, which is able to further reduce the hindrance to the rotation of the rotor 60 by the yarn S.

(4-5)

The yarn S engages with the notch 26 disposed in the corresponding inner wall 22. Therefore, the movement of the yarn S on the inner wall 22 is further reduced.

(4-6)

The notch 27 accepting the yarn S is formed in the outer wall 21. Therefore, the misalignment of the yarn S is able to be reduced.

(4-7)

The motor 100 has the above-mentioned stator 50. Therefore, the assembly of the motor 100 is facilitated, which is able to reduce fractures of the coil windings 30, the outgoing lines 40, and other parts.

(5) Modification (5-1) Shape of Passage Portion 24

Figure 9:
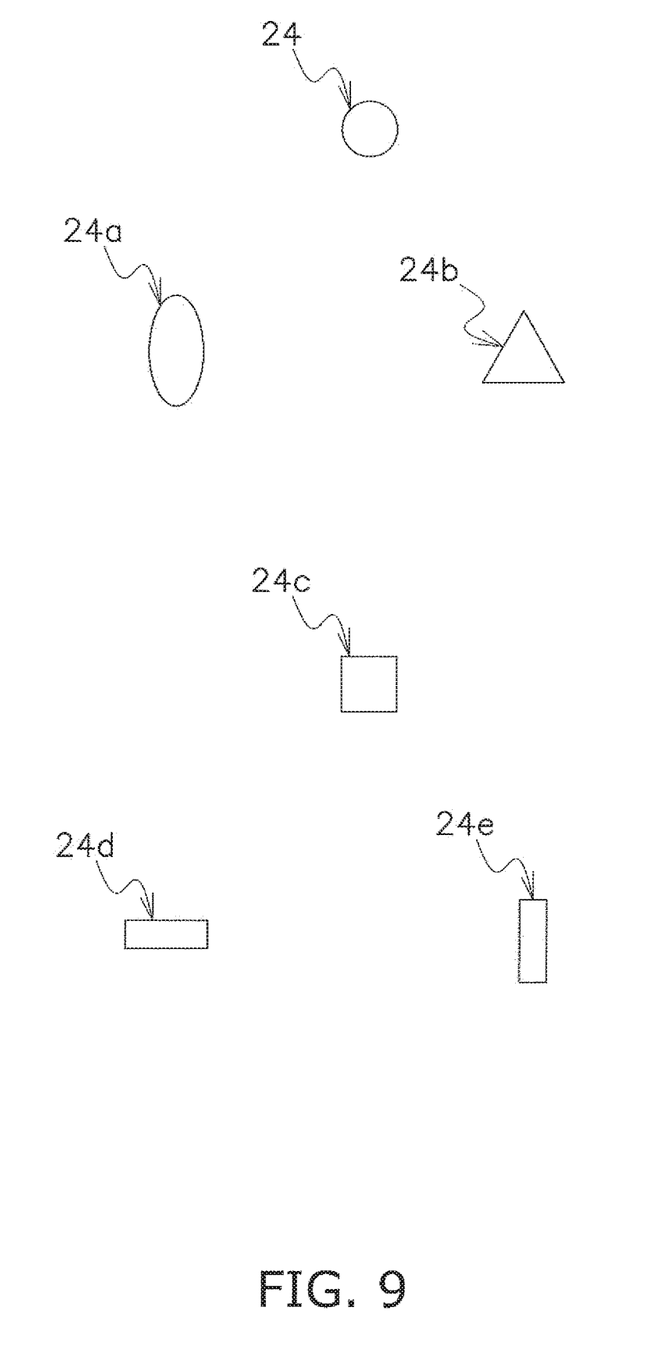
FIG. 9 is a side view showing modifications of the shape of a passage portion 24.

In the above-mentioned first embodiment, as shown in FIG. 9, the shape of the passage portion 24 is circular. Instead of this, an elliptical passage portion 24a, a triangular passage portion 24b, a square passage portion 24c, or rectangular passage portions 24d and 24e as shown in FIG. 9 may be employed.

(5-2) Lower Insulator

In the above-mentioned first embodiment, as shown in FIG. 1, the lower insulator 20' having a shape different from that of the upper insulator 20 is disposed on the lower end surface 14 of the stator 50. Instead of this, the insulator 20 may also be disposed on the lower end surface 14 of the stator 50 to secure the outgoing lines 40 on both of the upper side and the lower side of the stator 50.

(5-3) The Number of Passage Portions 24

In the above-mentioned first embodiment, as shown in FIG. 2, the number of the passage portions 24 is the same as the number of the coil windings 30. Instead of this, the number of the passage portions 24 may be less than or more than the number of the coil windings 30.

(5-4) The Numbers of Teeth 11 and Coil Windings 30

In the above-mentioned first embodiment, both of the number of the teeth 11 and the number of the coil windings 30 are nine. Instead of this, the number of the teeth 11 and the number of the coil windings 30 may be six, twelve, or, other numbers.

(5-5) Configuration of Phase

Figure 10:
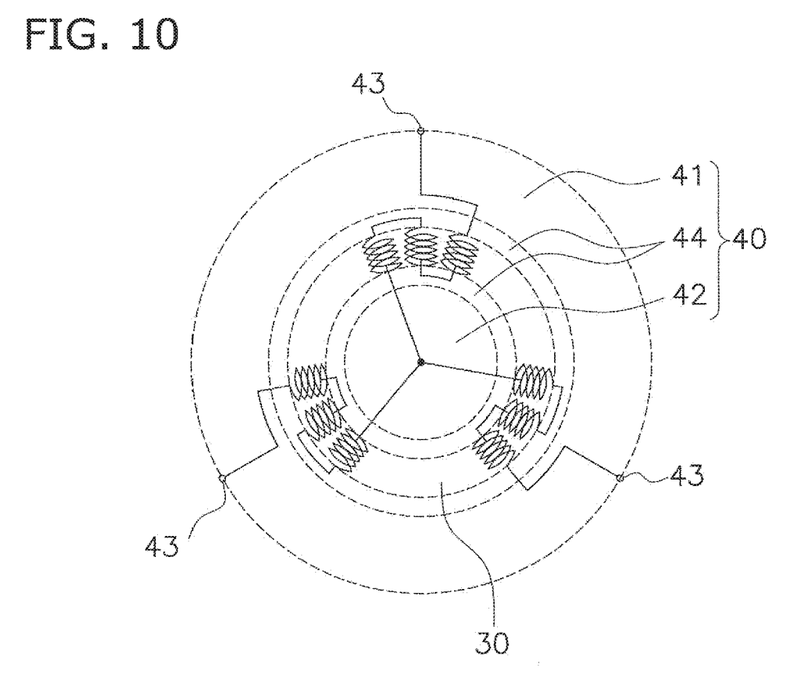
FIG. 10 is a diagram of an electrical circuit of a stator 50 of a motor according to a modification of the first embodiment of the present invention.

In the above-mentioned first embodiment, the coil windings 30 constituting each phase are connected in parallel as shown in FIG. 7. Instead of this, the coil windings 30 constituting each phase may be connected in series as shown in FIG. 10. In this case, the outgoing lines 40 include not only the power line 41 and the neutral line 42 but also coil connection lines 44 connecting two coil windings 30.

Second Embodiment

Figure 11:
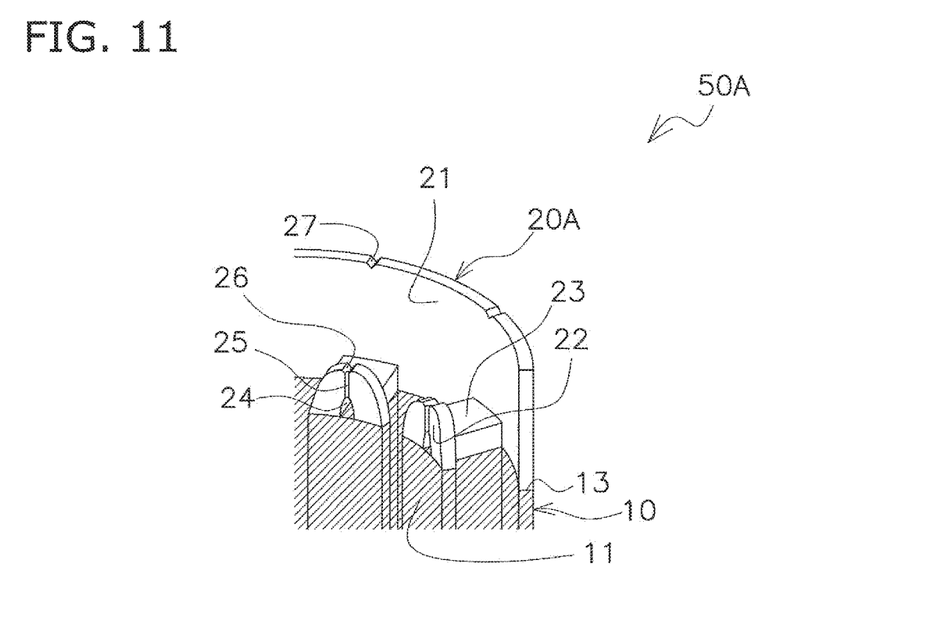
FIG. 11 is a perspective view of the insulator 20A placed on the stator core 10 of a stator 50A of the motor 100 according to a second embodiment of the present invention.

FIG. 11 shows a stator 50A with which the motor 100 according to a second embodiment of the present invention is provided. An insulator 20A of the stator 50A has passage portions 24 having a configuration different from that of the passage portions 24 of the insulator 20 of the motor 100 according to the first embodiment. Same reference numerals refer to configuration elements similar to those in the first embodiment.

In the present embodiment, the passage portions 24 are formed as recess portions open at the lower surface of the insulator 20A. With this configuration, the manufacture of the insulator 20A can be facilitated.

The modifications of the first embodiment may be applied to the present embodiment.

Third Embodiment (1) Overall Configuration

Figure 12:
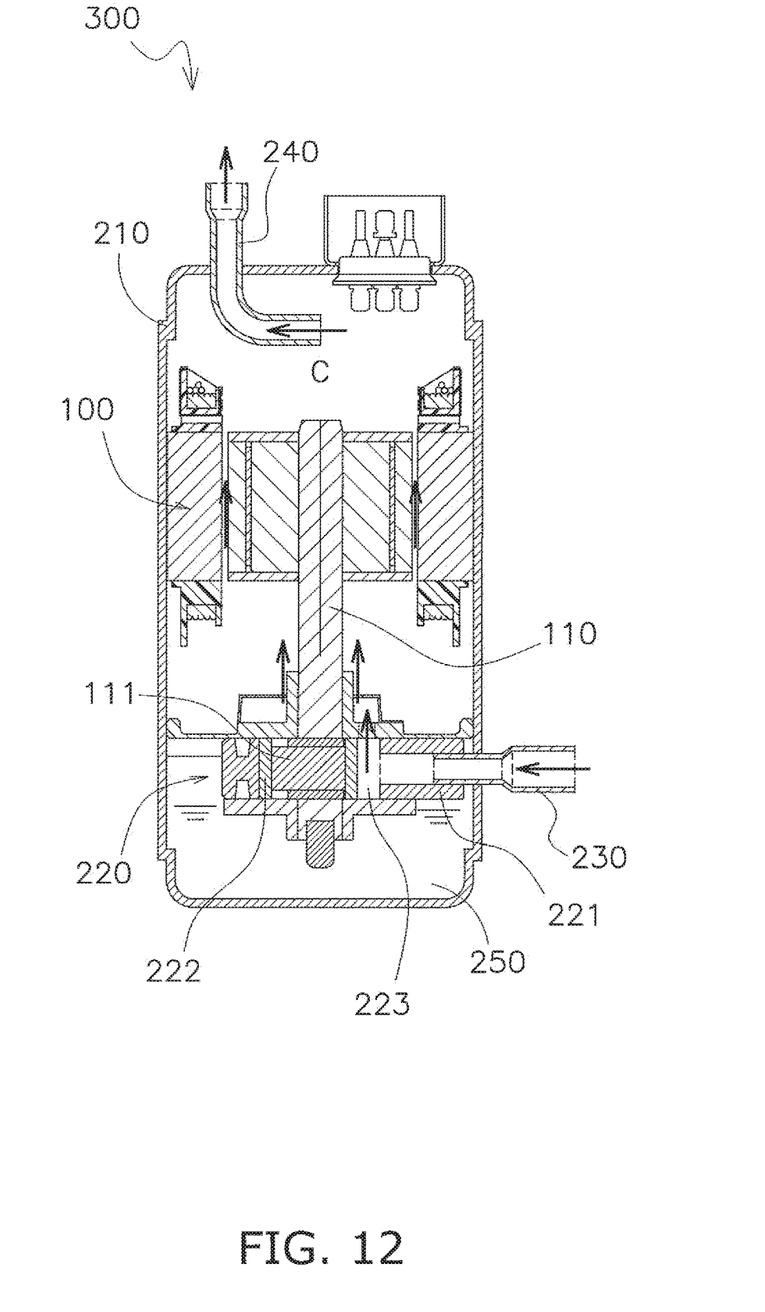
FIG. 12 is a sectional view of a compressor 300 according to a third embodiment of the present invention.

FIG. 12 is a sectional view of a compressor 300 according to a third embodiment of the present invention. The compressor 300 is mounted in an air conditioning apparatus or the like, and is used to compress fluid refrigerant or the like.

The compressor 300 is provided with the motor 100, the shaft 110, a pressure vessel 210, a fluid compression mechanism 220, a suction pipe 230, a discharge pipe 240, and a lubrication oil reservoir portion 250.

(2) Detailed Configuration
(2-1) Pressure Vessel 210

The pressure vessel 210 is able to withstand high pressure and houses other components of the compressor 300.

(2-2) Motor 100

The motor 100 is the motor 100 according to the first embodiment, the motor 100 according to the second embodiment, or motors according to their modifications. The pressure vessel 210 doubles as the casing 90 of the motor 100 (FIG. 1).

(2-3) Shaft 110

The shaft 110 transmits power of the motor 100 to the fluid compression mechanism 220 and has an eccentric portion 111.

(2-4) Fluid Compression Mechanism 220

The fluid compression mechanism 220 compresses fluid with the power of the motor 100 and has a cylinder 221 and a piston 222. The cylinder 221 and the piston 222 define a compression chamber 223. The piston 222 is disposed at the eccentric portion 111 of the shaft 110. When the shaft 110 rotates, the piston 222 moves to vary a volume of the compression chamber 223. Thus, the fluid is compressed.

(2-5) Suction Pipe 230

The suction pipe 230 guides the fluid before compression to the fluid compression mechanism 220.

(2-6) Discharge Pipe 240

The discharge pipe 240 guides the fluid after compression to the outside of the pressure vessel 210.

(2-7) Lubrication Oil Reservoir Portion 250

The lubrication oil reservoir portion 250 stores lubrication oil for lubricating the fluid compression mechanism 220 and other mechanisms.

(3) Characteristics

The compressor 300 has the stator 50 or the stator 50A as mentioned above. Therefore, the assembly of the compressor 300 is facilitated, which is able to reduce fractures of the coil windings 30, the outgoing lines 40, and other parts.

INDUSTRIAL APPLICABILITY

The present invention is widely applicable to motors used in all technical fields. Furthermore, the present invention is also applicable to compressors mounted in air conditioning apparatuses.

REFERENCE SIGNS LIST

C Central Axis
S Yarn
10 Stator Core
11 Teeth
13 Upper End Surface
14 Lower End Surface
20, 20A Upper Insulator
20' Lower Insulator
21 Outer Wall
22 Inner Wall
23 Teeth Cover Portion
24 Passage Portion
25 Groove
26 Notch
27 Notch
30 Coil Winding
40 Outgoing Line
50, 50A Stator
51 Cavity
60 Rotor
100 Motor
110 Shaft
210 Pressure Vessel
220 Fluid Compression Mechanism
300 Compressor

CITATION LIST

Patent Document

PATENT DOCUMENT 1: JP-B-3824001

What is claimed is:

1. A stator having a central axis, the stator comprising:
a core having a plurality of teeth radially inwardly extending toward the central axis;
an insulator placed on an end surface of the core;
a plurality of coil windings, the coil windings each wound around one of the teeth;
outgoing lines extending from both ends of each of the coil windings; and
a yarn securing the outgoing lines to the insulator,
the insulator having
an outer wall surrounding the central axis and erected in such a way as to upwardly extend from the end surface, a plurality of teeth cover portions radially inwardly extending from the outer wall toward the central axis, and a plurality of inner walls, the inner walls each being erected at an end portion of each of the teeth cover portions, the coil windings being placed between the outer wall and corresponding inner walls, a passage portion radially extending and being formed in at least one of the teeth cover portions to pass the yarn, the yarn being wound radially around the outer wall and the inner walls, and the passage portion being spaced from the coil windings.

2. The stator according to claim 1, wherein
at least one of the inner walls has yarn constraint element arranged to constrain the yarn.

3. The stator according to claim 2, wherein
the passage portion is formed in each of two or more of the teeth cover portions, and
two or more of the inner walls each have the yarn constraint element.

4. The stator according to claim 3, wherein
the yarn constraint element includes a groove arranged to house the yarn.

5. The stator according to claim 3, wherein
the yarn constraint element includes a notch engageable with the yarn.

6. The stator according to claim 2, wherein
the yarn constraint element includes a groove arranged to house the yarn.

7. The stator according to claim 6, wherein
the yarn constraint element includes a notch engageable with the yarn.

8. The stator according to claim 2, wherein
the yarn constraint element includes a notch engageable with the yarn.

9. The stator according to claim 2, wherein
a notch engageable with the yarn is disposed at a location above the passage portion in the outer wall.

10. The stator according to claim 2, wherein
the passage portion has a circular, an elliptical, or a triangular sectional shape.

11. The stator according to claim 1, wherein
a notch engageable with the yarn is disposed at a location above the passage portion in the outer wall.

12. The stator according to claim 1, wherein
the passage portion has a circular, an elliptical, or a triangular sectional shape.

13. A motor including the stator according to claim 1, the motor further comprising
a rotor magnetically interacting with the stator.

14. A compressor including the motor according to claim 13, the compressor further comprising
a shaft allowed to rotate by the motor;
a fluid compression mechanism compressing fluid with rotation of the shaft; and
a pressure vessel housing the motor, the shaft, and the fluid compression mechanism.

15. The stator according to claim 1, wherein
the passage portion is spaced from the core.

16. The stator according to claim 15, wherein
at least one of the inner walls has yarn constraint element arranged to constrain the yarn.

17. The stator according to claim 15, wherein
a notch engageable with the yarn is disposed at a location above the passage portion in the outer wall.

18. The stator according to claim 15, wherein
the passage portion has a circular, an elliptical, or a triangular sectional shape.

* * * * *